Figure 1:
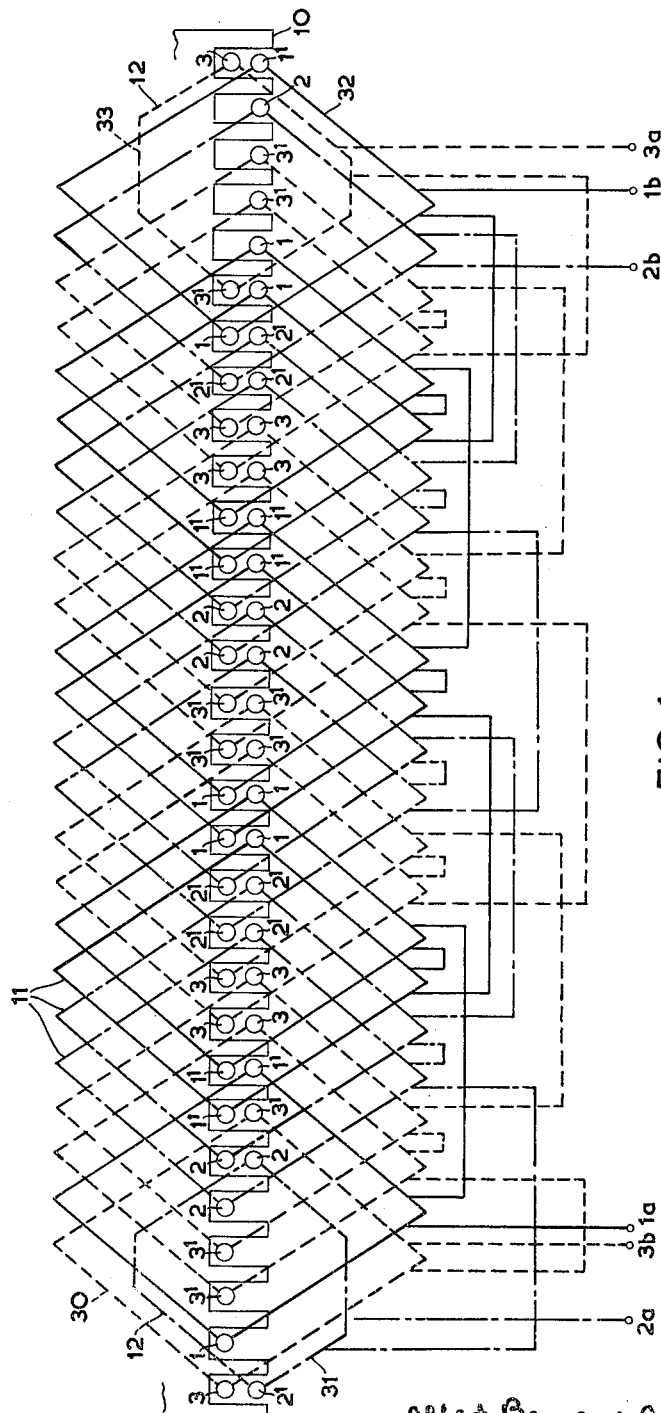

Oct. 17, 1961     A. B. J. REECE     3,005,116
DISCONTINUOUS INDUCTION TYPE DYNAMO-ELECTRIC MACHINES
Filed June 2, 1958     4 Sheets-Sheet 1

Inventor:
Albert Benjamin John Reece
By Stevens, Davis, Miller & Mosher
Attorneys

United States Patent Office 3,005,116
Patented Oct. 17, 1961

3,005,116
DISCONTINUOUS INDUCTION TYPE DYNAMO-ELECTRIC MACHINES
Albert Benjamin John Reece, Stafford, England, assignor to The English Electric Company Limited, London, England, a British company
Filed June 2, 1958, Ser. No. 739,092
Claims priority, application Great Britain June 4, 1957
8 Claims. (Cl. 310—11)

This invention relates to discontinuous induction-type dynamo-electric machines, that is to say to induction-type dynamo-electric machines of the kind having a discontinuous primary or inducing member. By "discontinuous primary or inducing member" is meant a primary or inducing member extending linearly, or along an arc, and having ends—unlike, for example, the stator or primary member of a conventional cylindrical rotor induction motor. Whereas the resulting magnetic field associated with the stator of such a conventional or "continuous" induction motor rotates synchronously, the resulting magnetic field associated with a "discontinuous primary member" travels along the length of the primary member.

The following are examples of discontinuous induction-type dynamo-electric machines: (a) the linear induction motor, in which a linearly-extending stator propels a secondary member along a linear path, (b) the arc motor, in which a stator member co-operating with a conventional cylindrical rotor or secondary member extends over an arc only of the periphery of the rotor, and (c) the linear electro-magnetic induction liquid pump for pumping an electrically-conductive liquid through a duct, the liquid in hte duct forming the secondary member of the pump.

According to the present invention, a discontinuous induction-type dynamo-electric machine comprises, in combination, relatively movable co-operating primary and secondary members, the primary member carrying a polyphase A.C. winding distributed along the length thereof so that when energized the specific electric loading of a portion at each end of the primary member is of a substantially low value as compared with the specific electric loading of the central portion between the end portions, and having disposed at the respective junctions of the central and end portions matching conductors which when energized by alternating currents produce alternating M.M.F.'s at the junctions which maintain the magnitudes of the respective M.M.F.'s on either side of said junctions substantially in proportion to the respective specific electric loadings on either side of said junctions whereby the M.M.F. in each portion is rendered dependent on the specific electric loading of that portion alone, the resulting travelling magnetic field moving along substantially the whole length of the primary member at the same speed, but being of a constant lower magnitude over said end portions, and inducing currents in the secondary member which react with the travelling field so as to exert propulsive forces on the secondary member.

By "specific electric loading" is meant the number of ampere-conductors per unit length of the primary member measured along the length of the primary member.

The distributed winding may be arranged to produce in the central portion of the primary member a whole number of poles, and in each end portion a single pole; the distributed winding may also be arranged to have a specific electric loading in each end portion equal to half the specific electric loading of the central portion.

According to another feature of the invention, the primary member has disposed at the outer ends of the end portions further matching conductors which when energized by alternating currents produce alternating M.M.F.'s at the outer ends of the said end portions which maintain the respective M.M.F.'s at the outer ends of the primary member substantially of zero value.

According to another feature of the invention, matching conductors and adjacently disposed conductors of the distributed winding which are magnetically mutually-cancelling are omitted, and other matching conductors are disposed in the positions of the conductors of the distributed winding so omitted.

Figure 3:
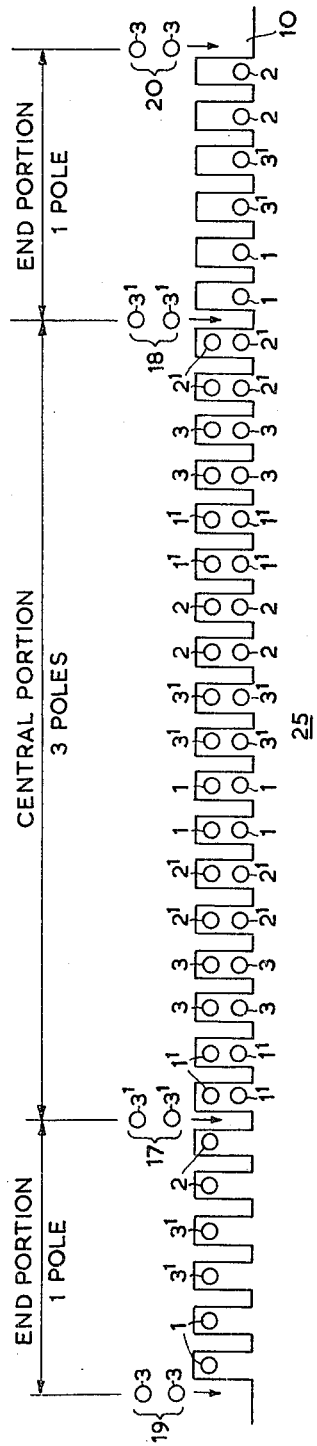
Figure 4:
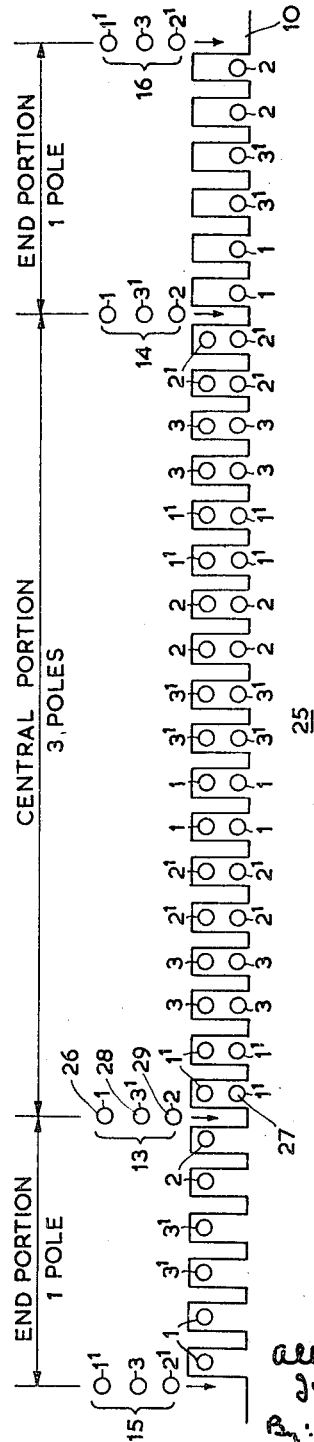
Figure 5:
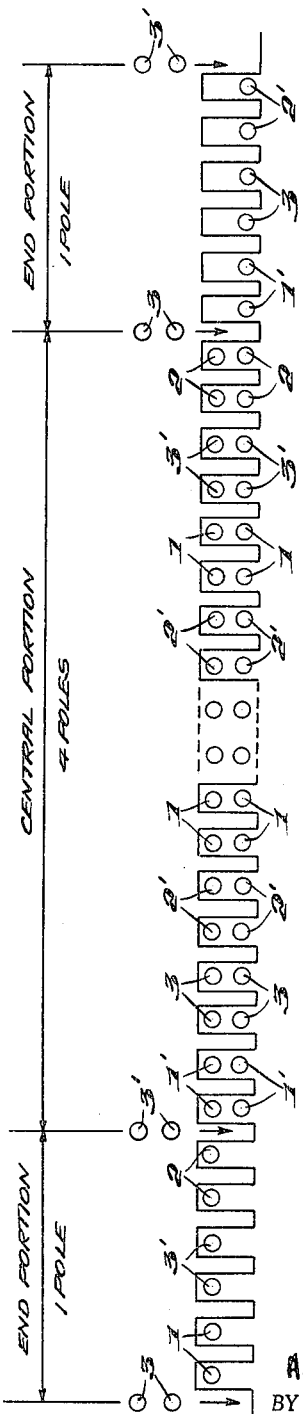

Other features of the present invention will appear from the following description, with reference to the accompanying drawings, of various linear electromagnetic induction liquid pumps embodying the present invention. FIG. 1 shows diagrammatically a stator winding arrangement for the pump shown in FIG. 2, FIG. 2 being a diagrammatic sectional side elevation of the pump. FIGS. 3, 4 and 5 show diagrammatically the stator winding arrangements of further pumps referred to in the following description.

Figure 2:
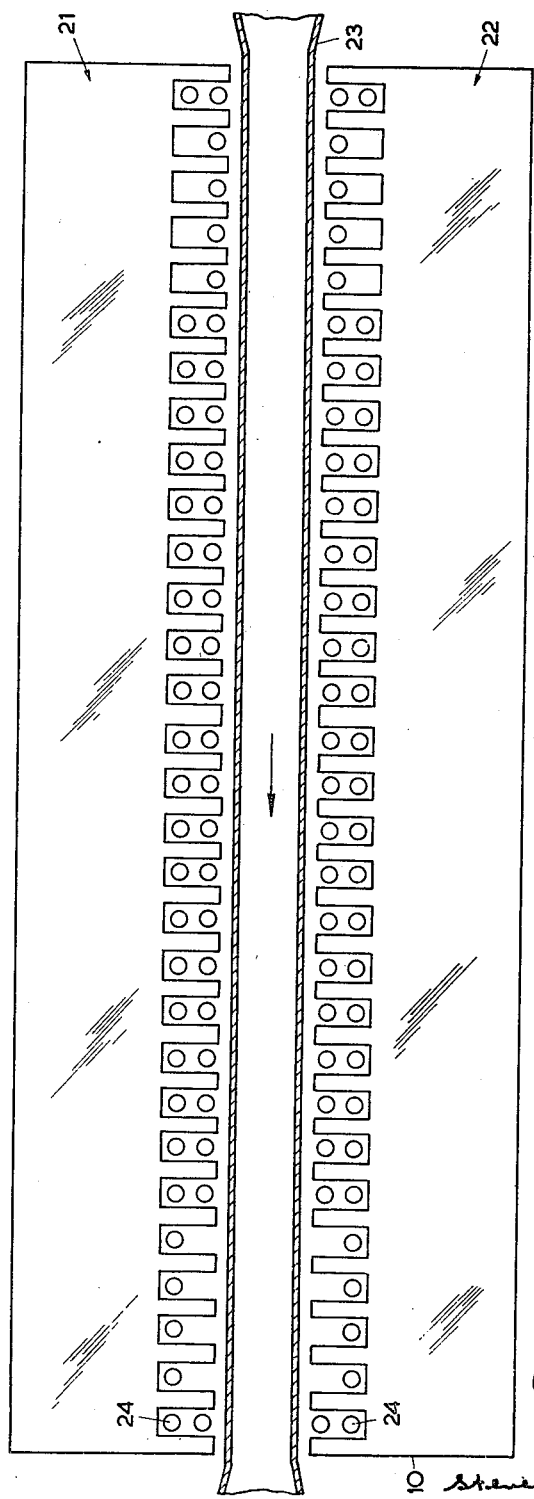

Referring now to FIGS. 1 and 2, the pump comprises two similar stator or primary members 21, 22 secured in position on either side of a liquid conduit or duct 23 through which liquid is propelled by the pump in a direction from right to left as seen in the figures.

Each stator member 21, 22 comprises a ferro-magnetic core member 10 extending along the length of the liquid conduit, being made up of a number of axially extending laminations. Each core member is slotted along its length and carries a distributed-type two-layer three phase winding 24 disposed in said slots. The windings are arranged when energized from a three phase A.C. supply source to produce a resultant magnetic field which acts across the depth of the liquid conduit (that is across the gap between the two stator members) and which in effect travels at synchronous speed along substantially the whole length of the primary members. The travelling magnetic field induces currents in the liquid in the conduit which react wtih the travelling field to exert propulsive forces on the liquid in the conduit. The liquid in the conduit thus acts as the secondary member of the pump.

Since each stator member is generally similar to the other, the winding of the upper stator member 21 only will be described in detail. The winding 21 comprises a number of similar two-layer diamond type coils 11 in combination with two similar single-layer coils 12 disposed one at each end of the winding, the various coils being connetced together in the manner shown in FIG. 1 to form a three phase five pole winding. The respective coil sides forming the coils are represented in the FIG. 1 by circles, the coil sides being shown in end elevation in the positions they occupy in the slots of the stator core member 10, with the end parts of the coils connecting said circles. The coil sides of the respective phase are designated by the phase numbers "1," "2" and "3," and the end parts of the coils and the end connections thereto are distinguished in their style of representation, phase "1" end parts and connections being shown in full lines, phase "2" in chain-dotted lines, and phase "3" in dotted lines.

Those coil sides which are marked with a dash, e.g. 1', 2', 3', carry currents which flow in opposite directions to the currents in the coil sides not so marked with a dash, e.g. 1, 2, 3. The terminals of the winding are designated 1a, 1b, 2a, 2b, 3a, 3b.

The pump so far described constitutes a modification of, and an improvement of, a second pump embodying the present invention, the pump already described differing only in the respect that it has a different stator winding arrangement on each of its stator members.

A full appreciation of the constitution and mode of operation of the winding shown in FIG. 1 will be best obtained from a description of the stator winding arrangement of the above referred to second pump, so that the latter stator winding arrangement will now be described with reference to FIG. 3.

Like FIG. 1, FIG. 3 shows diagrammatically and in a similar manner the arrangement of the coil sides constituting the winding of the upper stator member of the second pump. In FIG. 3, however, for the sake of clarity the end parts of the respective coils of the winding, and the end connections thereto, are omitted.

The winding comprises, in combination, a three phase, five pole, two-layer distributed winding, generally indicated at 25, together with two groups of "matching" or "compensating" conductors 17, 18 disposed respectively at the junctions of the first and second, and fourth and fifth poles.

The distributed winding comprises a plurality of diamond type coils disposed consecutively in the slots of the stator core member, each coil having one coil side in the upper winding layer and the other coil side in the bottom winding layer. The coils are full-pitched and are connected in known manner to form a three phase winding of known kind.

Since the coils are full-pitched the end portions of the stator core member (corresponding to the end poles) have coil sides in one winding layer only, whereas the central portion (corresponding to the central three poles) has coil sides in both winding layers. Consequently, when the distributed winding is energized by a suitable three phase supply source, the end portions each have a specific electric loading equal to one half the specific electric loading of the central portion, that is the number of ampere-conductors per unit length of each end portion is equal to half of the number of ampere-conductors per unit length of the central portion. The end portions may therefore be referred to conveniently as being "half-wound," and the central portion "fully-wound."

The matching conductors disposed at the respective junctions of the end and central portions of the stator core member comprise at each junction two conductors connected in circuit with the third phase of the distributed winding and arranged to carry the third phase current in the reverse sense as indicated in the figure. These matching conductors provide at each junction an alternating matching or compensating M.M.F. having an amplitude equal to one half of that due to the peak ampere-turns per pole produced by the central portion of the stator core member, varying in an anti-phase relationship with the current supplied to the third phase of the distributed winding. Whereas the magnetic field in the "air gap" (that is, in the liquid in the conduit) due to the distributed winding only comprises in the central portion of the stator core member a travelling magnetic field which provides substantially the whole of the output pressure head of the pump, in the end portions of the stator core member the gap magnetic field includes an appreciable pulsating component which adds to the losses of the pump without materially increasing the output pressure head of the pump. Furthermore, the distributed winding alone produces a large undesirable component of core flux (that is flux in the yoke of the core member).

The M.M.F. provided by the matching conductors at each junction is arranged to be such that the respective M.M.F.'s on either side of the junction are maintained at all instants in proportion to the respective specific electric loadings on either side of the junction, so that the resultant magnetic field in the "air gap" travels along substantially the whole length of the stator core member, the magnitude of the gap magnetic field intensity being in the end portions half that in the central portion. The M.M.F. and gap flux in each portion of the stator core member are thus rendered dependent solely on the specifice electric loading in that portion alone.

The matching conductors are disposed in special slots (not shown) formed in the core member at the junctions of said end and central portions, but are shown in FIG. 3 separated from the coil sides of the distributed winding 25 for the sake of clarity.

Whilst the winding just described gives rise to a travelling magnetic field which travels along substantially the whole of the length of the core member, it also gives rise to a pulsating M.M.F. at each end of the stator core member which acts around the end leakage path. Although this pulsating M.M.F. is much less than that produced by a pump having fully-wound end portions the pulsating M.M.F. will give rise to some pulsation of the gap magnetic field at the ends of the stator core members.

To overcome this undesirable pulsation (though this is not essential) the pump may be improved by adding at each end of each stator core member further matching or compensating conductors which reduce the M.M.F. acting around the end leakage paths to zero value at all times. Thus in a third magnetic pump similar to the second one just described, further matching conductors 19, 20 are added at each end of the stator core member, the matching conductors at each end comprising, as is shown in FIG. 3, two conductors connected in series with the third phase winding of the distributed winding. These conductors are arranged to produce at each end of the stator core member an alternating M.M.F. having an amplitude equal to one half of that due to the peak ampere-turns per pole produced by the central portion of the stator core member, varying in an in-phase relationship with the current supplied to the third phase of the distributed winding.

Whereas in the second and third pumps just described the matching or compensating conductors have been constituted by sets of two conductors energized by the current of the third phase winding, in one sense or another, it will be appreciated that any arrangement of conductors which produces the desired alternating M.M.F. may be used. Thus, in a further pump, as shown in FIG. 4, the matching conductors disposed at each end of the stator core member and which carry the third phase current are replaced by two sets of three similar conductors 15, 16 carrying respectively the first phase current reversed, the second phase current reversed, and the third phase current; and the matching conductors disposed at each junction and which carry the third phase current reversed are replaced by two sets of three similar conductors 13, 14 carrying respectively the first phase current, the second phase current, and the third phase current reversed.

Whereas there is usually no difficulty in accommodating the matching conductors at each end of the stator core member (by forming for example further normal slots in the core member), there may be difficulty in some instances in accommodating the matching conductors at the junctions of the end and central portions between the normal slots occupied by the distributed winding.

This difficulty may be overcome by the realization that matching conductors and adjacently disposed conductors of the distributed winding which are magnetically mutually-cancelling may be omitted altogether. The spaces left by the omission of some of the coil sides of the distributed winding may then be filled by the remaining matching conductors.

Thus, referring to FIG. 4 for example, at the left-hand junction of the end and central portions the conductors or coil sides marked 26 and 27 are mutually-cancelling and can be omitted. Repositioning of the remaining matching conductors 28, 29 in the existing slots for the distributed winding 25 will result in the winding arrangement of FIG. 1.

The remaining matching conductors are conveniently arranged in FIG. 1 to form at the left-hand end of the pump a two-layer full-pitched coil 30 for connection in the manner shown in series with the third phase of the distributed winding, this coil being physically the same as those constituting the distributed winding in the central portion, and a single-layer short-pitched coil 31 for connection in series with the second phase of the distributed winding in the manner shown. Similarly, at the right-hand end of the pump the remaining matching conductors are arranged to form a normal full-pitched two-layer coil 32 for connection in series with the first phase of the distributed winding in the manner shown, and a single-layer short-pitched coil 33 for connection in series with the third phase in the manner shown.

Since in the improved winding arrangement of FIG. 1 the various matching conductors at each junction are not all placed in the same axial positions along the length of the core member as in the case of the winding arrangements of FIGS. 3 and 4, but are distributed in effect over a small part of the stator core member, the transition in the gap magnetic field intensity from one value to the other at the junction takes place less abruptly.

The use of matching or compensating conductors is not limited to stators having an odd number of poles, but may be equally applied to conductors having an even number of poles. In such stators the directions of the currents in the two groups of matching conductors associated with one end portion are reversed relative to those in the matching conductors associated with the other end portion of the stator. Thus, for example, if an additional pole were added to FIG. 3 at the right-hand side the matching conductors associated with the right-hand end portion of the stator core member would carry currents in the reverse sense to those shown in FIG. 3, as is shown in FIG. 5.

Whereas in the above description the end portion of the stator core member includes a whole pole pitch, other pumps arranged according to the invention may have end portions which include only a part of a whole pole pitch.

Although the pumps described above have full-pitched coils other pumps embodying the invention may have coils which are short-pitched (i.e. which extend over a distance less than a pole pitch), the half-wound portions at each end of the respective stator core members extending over a part only of a pole pitch dependent on the pitch of the coils, and the central portion extending over slightly more than a whole number of pole pitches.

Where other types of winding coils, e.g. pancake type coils in an annular type pump, are used to form a two-layer winding the ratio of the specific electric loadings in the end and central portions may be varied, and the matching conductors may accordingly be arranged to maintain the M.M.F. in each portion dependent on the specific electric loading of that portion alone in the manner already described.

Whereas in the winding arrangement described the matching conductors have been used to reduce the magnitude of the travelling magnetic field in the secondary member once only at each end of the stator core member, two or three successive reductions may be obtained at each end by adding further sets of matching conductors in the requisite positions, the matching conductors being arranged so as to maintain the ratio of the M.M.F.'s at all instants on either side of each set of matching conductors in proportion to the ratio of the specific electric loadings on either side of the set of matching conductors.

What I claim as my invention and desire to secure by Letters Patent is:

1. A discontinuous induction-type dynamo-electric machine comprising, in combination, relatively movable co-operating primary and secondary members, a polyphase A.C. winding mounted on the primary member and distributed along the length thereof in a manner so that when energized by a polyphase system of currents the specific electric loading of a portion at each end of the primary member is of a substantially lower value as compared with the specific electric loading of the central portion of the primary member between the end portions, and a plurality of matching conductors disposed at each of the respective junctions of the central and end portions which, when energized by alternating currents, produce alternating M.M.F.'s at the said junctions which maintain the magnitude of the respective M.M.F.'s on either side of the said junctions substantially in proportion to the respective specific electric loadings on either side of the said junctions, so that the M.M.F. in each portion is rendered dependent on the specific electirc loading of that portion alone, the resulting travelling magnetic field moving along substantially the whose length of the primary member at the same speed, but being of constant lower magnitude over said end portions, and inducing currents in the secondary member which react with the travelling field so as to exert propulsive forces on the secondary member.

2. A discontinuous induction-type dynamo-electric machine according to claim 1, wherein the distributed polyphase winding comprises a two-layer three-phase A.C. winding having conductors in both winding layers in the central portion and conductors in one winding layer only in each of the respective end portions, the winding having phases "1," "2," and "3" arranged to produce when connected to a three-phase supply source an odd number of poles in the central portion and a single pole in each of the end portions, and the winding being arranged so that the junctions of the end and central portions are disposed between adjacent conductors of the first and second phases, and wherein the matching conductors provide, when energized, at each junction an alternating M.M.F. having an amplitude equal to one half of that due to the peak ampere-turns per pole produced by the winding in the central portion, varying in an anti-phase relationship with the current supplied to the third phase of the distributed winding.

3. A discontinuous induction-type dynamo-electric machine according to claim 1, wherein the distributed polyphase winding comprises a two-layer three-phase A.C. winding having conductors in both winding layers in the central portion and conductors in one winding layer only in each of the end portions, the winding having phases "1," "2," and "3" arranged to produce when connected to a three-phase supply source an even number of poles in the central portion and a single pole in each end portion, and the winding being arranged so that the junctions of the central and end portions are disposed between adjacent conductors of the first and second phases, the said first phase conductors being disposed at one junction in the central portion of the primary member, and at the second junction in an end portion of the primary member, and wherein the matching conductors provide, when energized, at each junction an alternating M.M.F. having an amplitude equal to one half of that due to the peak ampere-turns per pole produced by the winding in the central portion, varying at the first-mentioned junction in an anti-phase relationship with the current supplied to the third phase of the distributed winding, and at the second junction in an in-phase relationship with the current supplied to the third phase of the distributed winding.

4. A discontinuous induction-type dynamo-electric machine according to claim 1, including further matching conductors disposed at the outer ends of the respective end portions which when energized by alternating currents produce alternating M.M.F.'s at the outer ends of the respective end portions which maintain the respective M.M.F.'s at the outer ends of the primary member substantially of zero value.

5. A discontinuous induction-type dynamo-electric machine according to claim 2, including further matching conductors disposed at the outer ends of the respective end portions which when energized by alternating currents produce at the outer end of each end portion an alternating M.M.F. having an amplitude equal to one half of that due to the peak ampere-turns per pole produced by the winding in the central portion and varying in an in-phase relationship with the current supplied to the third phase of the distributed winding.

6. A discontinuous induction-type dynamo-electric machine according o claim 3, including further matching conductors disposed at the outer ends of the respective end portions which when energized by alternating currents produce at the outer end of each end portion an alternating M.M.F. having an amplitude equal to one half of that due to the peak ampere-turns per pole produced by the winding in the central portion, varying at the outer end of the end portion disposed adjacent said first-mentioned junction in an in-phase relationship with the current supplied to the third phase of the distributed winding, and at the outer end of the other end portion in an anti-phase relationship with the current supplied to the third phase of the distributed winding.

7. A discontinuous induction-type dynamo-electric machine according to claim 5, wherein the matching conductors which produce an alternating M.M.F. varying in an anti-phase relationship with the current supplied to the third phase comprise in effect a system of three conductors carrying respectively the first phase current, the second phase current, and the third phase current reversed, and the matching conductors which produce an alternating M.M.F. varying in an in-phase relationship with the current supplied to the third phase comprise in effect a system of three conductors carrying respectively the first phase current reversed, the second phase current reversed, and the third phase current, and wherein matching conductors and adjacent conductors of the distributed winding which are magnetically mutually-cancelling are omitted, other matching conductors being disposed in the positions otherwise occupied by the omitted conductors of the distributed winding.

8. A discontinuous induction-type dynamo-electric machine according to claim 7, wherein the primary member co-operates with a liquid conduit for an electrically-conductive liquid, the secondary member of the dynamo-electric machine being constituted by the liquid in the conduit.

References Cited in the file of this patent

UNITED STATES PATENTS 2,702,004  Blake et al. _____ Feb. 15, 1955

FOREIGN PATENTS 723,570  Great Britain _____ Feb. 9, 1955